(12) United States Patent
Drummond (10) Patent No.: US 11,203,032 B2
(45) Date of Patent: Dec. 21, 2021

(54) SHOWER HEADER SPRAY SYSTEM

(71) Applicant: Spraying Systems Co., Wheaton, IL (US)

(72) Inventor: Benjamin H. Drummond, Wheaton, IL (US)

(73) Assignee: Spraying Systems Co., Wheaton, IL (US)

( * ) Notice: Subject to any disclaimer, the term of this patent is extended or adjusted under 35 U.S.C. 154(b) by 82 days.

(21) Appl. No.: 16/091,516

(22) PCT Filed: Apr. 7, 2017

(86) PCT No.: PCT/US2017/026502
§ 371 (c)(1),
(2) Date: Oct. 4, 2018

(87) PCT Pub. No.: WO2017/177082
PCT Pub. Date: Oct. 12, 2017

(65) Prior Publication Data
US 2019/0126311 A1     May 2, 2019

Related U.S. Application Data

(60) Provisional application No. 62/319,671, filed on Apr. 7, 2016.

(51) Int. Cl.
*B05B 15/00* (2018.01)
*B05B 15/50* (2018.01)
(Continued)

(52) U.S. Cl.
CPC .............. *B05B 15/50* (2018.02); *A46B 13/02* (2013.01); *B05B 1/20* (2013.01); *B08B 1/04* (2013.01)

(58) Field of Classification Search
CPC ..................................... B05B 1/02; B05B 1/18
(Continued)

(56) References Cited

U.S. PATENT DOCUMENTS 2,298,934 A * 10/1942 Foster ..................... B05B 1/042
239/590.3
2,841,429 A *  7/1958 McCuistion ......... F16J 15/3236
277/402

(Continued)

*Primary Examiner* — Viet Le
(74) *Attorney, Agent, or Firm* — Leydig, Voit & Mayer, Ltd, (57) ABSTRACT

A shower header spray device including an elongated spray header supporting a plurality of laterally spaced liquid spray nozzles each having a central dome formed with an elongated discharge orifice. The spray nozzles each are mounted in a respective pocket of the header, and an elongated rotatable cleaning brush assembly is provided for cleaning the discharge orifices of the spray nozzles. The spray nozzles each have an integrally formed externally threaded mounting ring which captively carries an annular sealing member, and the spray header pockets each are internally threaded for receiving respective spray nozzle screwed into the pocket with the annular sealing member interposed therebetween. The spray nozzles each have a pair of indicator notches to facilitate alignment of the elongated discharge orifices of the spray nozzles in common relation to a longitudinal axis of the spray header.

15 Claims, 6 Drawing Sheets

(51) Int. Cl.
  *B05B 1/20* (2006.01)
  *B08B 1/04* (2006.01)
  *A46B 13/02* (2006.01)

(58) Field of Classification Search
  USPC ........ 239/104, 106, 114, 115, 116, 123, 390,
       239/548, 550, 566, 590, 590.3;
       425/DIG. 47
  See application file for complete search history.

(56) References Cited

U.S. PATENT DOCUMENTS

| | | | | |
|---|---|---|---|---|
| 2,987,262 A * | 6/1961 | Goyette | ................... | D21G 7/00 239/550 |
| 3,129,777 A * | 4/1964 | Haspert | ................... | E21B 10/61 175/340 |
| 3,268,176 A * | 8/1966 | O'Brien | ................... | B05B 1/14 239/553.5 |
| 3,827,814 A * | 8/1974 | Laurent | ................. | F16B 7/0413 403/301 |
| D286,807 S * | 11/1986 | Paige | ........................... | D23/249 |
| 4,624,395 A * | 11/1986 | Baron | ................... | A47J 31/401 222/129.1 |
| RE32,840 E * | 1/1989 | Bingham | ............... | E21C 35/187 239/596 |
| 4,819,952 A * | 4/1989 | Edlund | ................ | F16J 15/3208 277/550 |
| 5,909,847 A * | 6/1999 | Munsche | ................ | D21D 5/04 239/116 |
| 5,927,616 A * | 7/1999 | Grise | ................... | A47L 15/4278 134/201 |
| 6,073,861 A * | 6/2000 | Wright | .................... | B05B 15/50 239/114 |
| 6,398,128 B1 * | 6/2002 | Hamilton | ................ | B05B 1/042 239/71 |
| 6,869,108 B2 * | 3/2005 | Kwon | ................... | F16L 37/088 285/276 |
| 7,387,264 B2 * | 6/2008 | Kassanits | ................ | B05B 15/65 239/71 |
| 7,617,990 B2 * | 11/2009 | Huffman | ............... | B05B 15/52 239/1 |
| 8,226,128 B2 * | 7/2012 | Lee | ........................ | F16L 37/092 285/305 |
| 8,641,417 B2 * | 2/2014 | Kumar | ............... | A61B 17/1646 433/125 |
| 8,746,750 B2 * | 6/2014 | Gilbreath | ............ | F16L 37/0887 285/321 |
| 2007/0102458 A1 * | 5/2007 | Valley | ...................... | B05B 9/01 222/334 |

* cited by examiner

SHOWER HEADER SPRAY SYSTEM

CROSS-REFERENCE TO RELATED APPLICATIONS

This patent application claims the benefit of U.S. Provisional Patent Application No. 62/319,671, filed on Apr. 7, 2016, which is incorporated by reference.

FIELD OF THE INVENTION

The present invention relates generally to liquid spraying systems, and more particularly to shower header-type spraying systems having a plurality of inset mounted spray nozzles which are adapted to direct parallel flat spray patterns and are configured such that discharge orifices of the nozzles can be simultaneous cleaned by a rotary brush mounted within the header.

BACKGROUND OF THE INVENTION

Shower header-type spraying systems are used in many industrial applications, such as for directing cleaning fluids onto rollers in pulp and paper mills and spraying cooling liquids onto processed metals in steel mills. Such spraying systems include an elongated header having a plurality of laterally spaced spray nozzles adapted for directing a curtain of flat spray patterns onto the processing line. Since a single processing line can include a multiplicity of such shower header-type spraying systems, significant cleaning, cooling, or other processing fluids can be used. To conserve processing fluid, it is common to collect the liquid during the course of a processing cycle, filter out the debris and contaminants from the fluid during a recycling process, and to reuse the liquid. Nevertheless, some solid particles and matter can pass through the filtering system which over time can plug or impede liquid flow through one or more of the spray nozzles in the header.

It is known for the shower headers to have an elongated cleaning brush that can be rotated to cause bristles of the brush to move across and clean the discharge orifices of the spray nozzles in the header. To facilitate such cleaning, the nozzles are mounted within respective recesses or pockets in the underside of the header and the discharge orifices of the nozzles are formed in upwardly protruding domes of the nozzles, as depicted in U.S. Pat. No. 7,617,990 assigned to the same assignee as the present application, the disclosure of which is incorporated herein by reference. The nozzle arrangements in that spraying system require three pieces to install, namely a nozzle, a gasket, and a locking ring for securing the nozzle in the header. These components can be difficult to install when the nozzles are not in easily accessible locations. When the nozzles have elongated flat spray discharge orifices, proper alignment of the discharge orifices also is critical for effecting uniform cleaning, cooling, or other spray applications. In the spraying system of the above referenced patent, the nozzle mates with a base on the header, and the base has a machining that only allows the nozzle to be installed it the correct position. Handling of the multiplicity of parts can not only be cumbersome during installation, but during the frequent cleaning necessary in many spray applications for which such shower header type spraying systems are used.

OBJECTS AND SUMMARY OF THE INVENTION

It is an object of the present invention to provide shower header spraying systems having spray nozzles with a relatively simple design that lend themselves to easy assembly and disassembly from the spray header.

Another object is to provide a shower header spraying system of the above kind in which the spray nozzles of the system comprise fewer parts for easier handling and more efficient manufacture.

A further object is to provide a shower header spraying system as characterized above in which the discharge orifices of the spray nozzles are easily precisely aligned for directing parallel flat spray discharge patterns for uniform cooling, cleaning, or other application.

Other objects and advantages of the invention will become apparent upon reading the following detailed description and upon reference to the drawings.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Referring now more particularly to the drawings, there is shown an illustrative shower header spraying system 10 in accordance with the invention, which has particular utility in paper and steel processing applications in which precisely oriented parallel spray flat patterns are directed in slightly angled relation to a longitudinal axis of the header for providing a uniform curtain of a liquid spray. The basic construction and operation of the illustrated shower header spraying system 10 is similar to that discloses in the aforereferenced U.S. Pat. No. 7,617,990.

Figure 1:
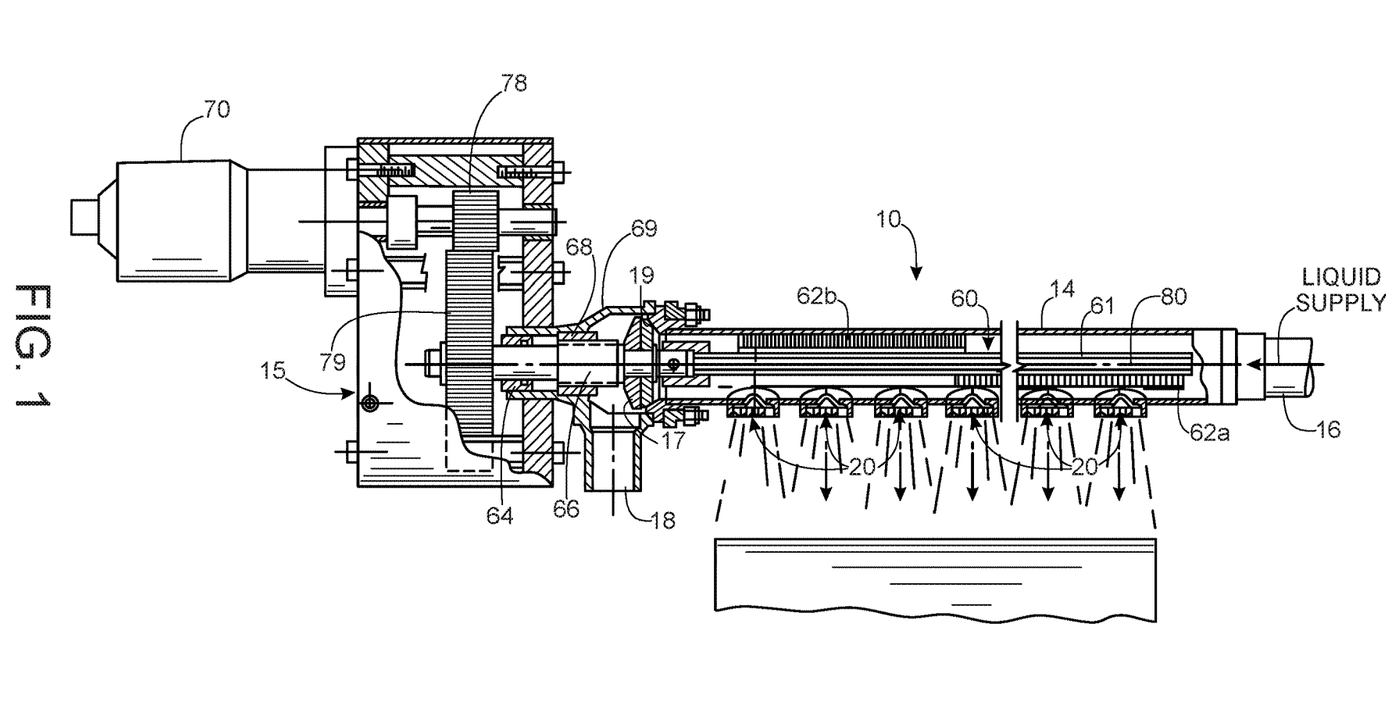
FIG. 1 is a longitudinal, vertical section of an illustrative shower header spraying system in accordance with the invention.

The shower header-spraying system 10, as depicted in FIG. 1, includes an elongated generally tubular-configured spray header 14 supported in cantilever relation from a support frame 15. The spray header 14 has an upstream end connected to a pressurized liquid supply 16, a drain pipe 18 communicating with a downstream end of the header 14, in this case extending in radial downward relation to the spray header 14, and a plurality of spray nozzles 20 mounted at uniformly spaced intervals laterally along the header 14. The illustrated header 14 includes a valve member 17, which is positionable against a valve seat 19 at the downstream end of the header 14 for sealing the downstream end of the header during a liquid spraying operation. Hence, pressurized liquid introduced into the inlet end of the header 14 is directed through the header and discharges through the plurality of spray nozzles 20.

In accordance with an important feature of the illustrated embodiment, the spray nozzles 20 each comprise an upwardly extending dome 21 having a discharge orifice 22 in the form of a cross slot for producing a flat fan liquid spray discharge and an integral outer externally threaded cylindrical mounting ring 24. The dome 21 is centrally disposed in upwardly extending fashion from the mounting ring 24, as view in FIG. 6. While the spray nozzles 20 in this case are mounted in an underside of the illustrated spray header 14, it will be understood that the spray header 14 may be oriented with the spray nozzles 20 directed at angles to the vertical. Hence, the terms upwardly and downwardly as used herein are not intended to be limited with reference to a vertical direction.

Figure 2:
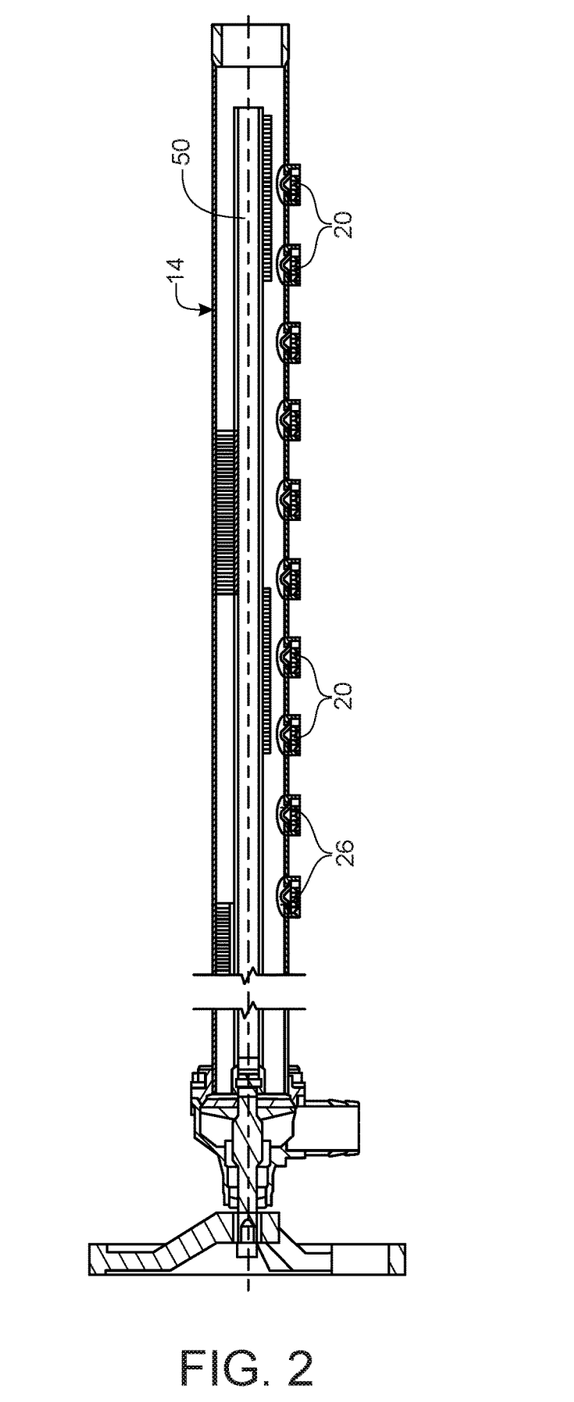
FIG. 2 is an enlarged longitudinal section of the spray header of the illustrative spraying system.
Figure 3:
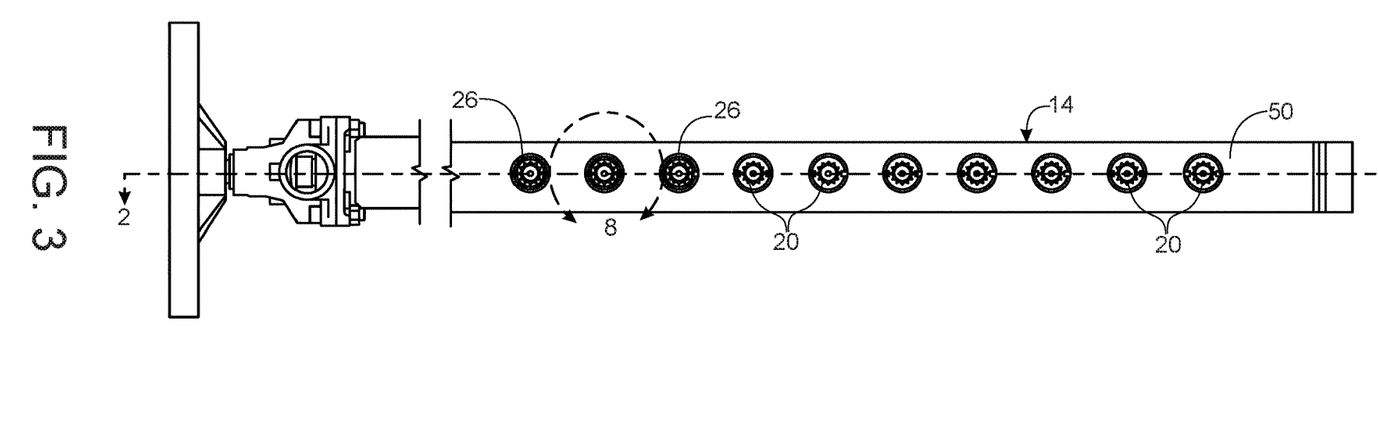
FIG. 3 is a bottom view of the spray header shown in FIG. 2.
Figure 5:
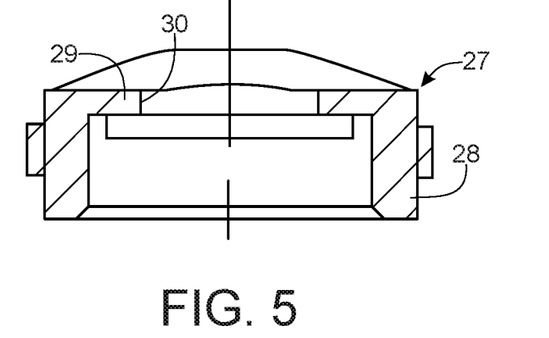
FIG. 5 is an enlarged vertical section of a base member that defines a spray nozzle receiving socket in the illustrated spray header.
Figure 9:
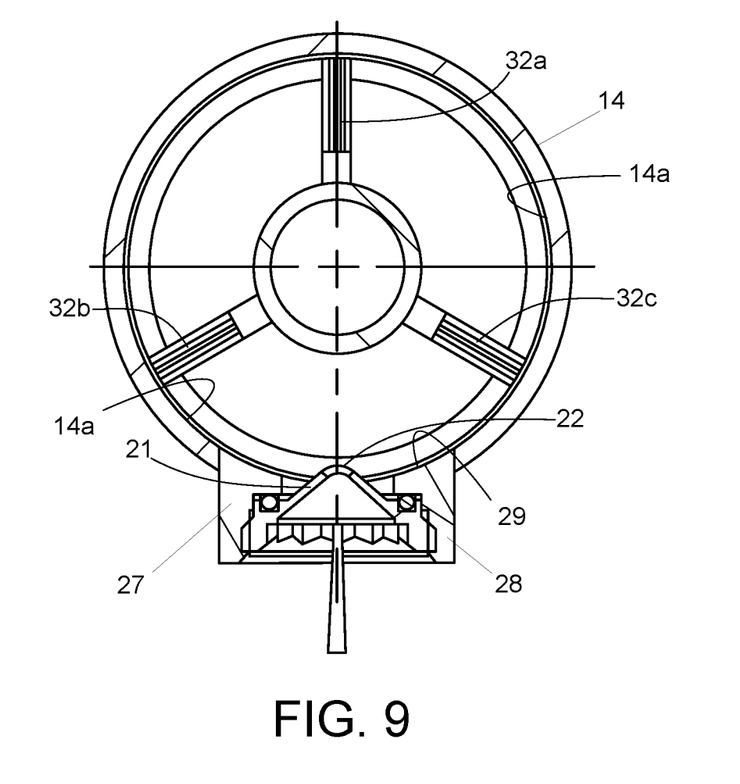
FIG. 9 is an enlarged transverse section of the illustrated spray header showing the cleaning brush thereof in relation to a spray nozzle mounted therein.

The spray nozzles 20 each are mounted in a respective recess or pocket 26 (FIGS. 2 and 3) in the bottom of the header 14 with the discharge orifice defining dome portion 21 extending upwardly into the header 14. The recesses or pockets 26 in this case are defined by individual base members 27 fixedly mounted, such as by welding, at laterally spaced locations in the bottom of the header 14. The base members 27 in this case comprise an internally threaded downwardly opening cylindrical hub 28 and a top wall 29 formed with a central opening 30 through which the dome portion 21 of the spray nozzle 20 protrudes into the spray header 14. The top wall 29 of the cylindrical hub 28, as depicted in FIG. 9, in this case has a semi-cylindrical shape corresponding to an inner cylindrical wall surface 14a of the header 14. (FIGS. 5 and 9). For mounting the spray nozzle 20 in the base member 27, the mounting ring 24 of the spray nozzle 20 is screwed into the internally threaded cylindrical hub 28. To facilitate such assembly, the spray nozzles 20 each have an annular recess 35 (FIGS. 6 and 7) in the underside or downstream end of the mounting ring 24 formed with an annular array of triangular configured flats 36 for receiving an appropriate wrench effective for screwing the spray nozzles 20 into the base member hub 28.

Figure 6:
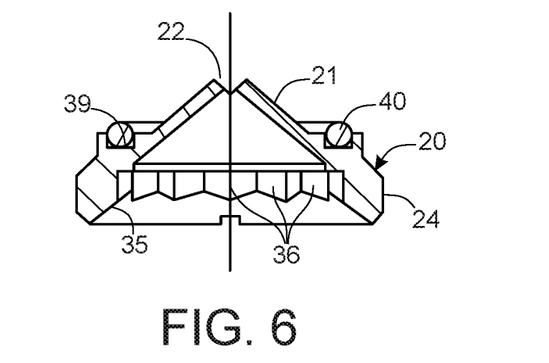
FIG. 6 is a longitudinal vertical section of one of the illustrated spray nozzles with a captively retained sealing o-ring.
Figure 7:
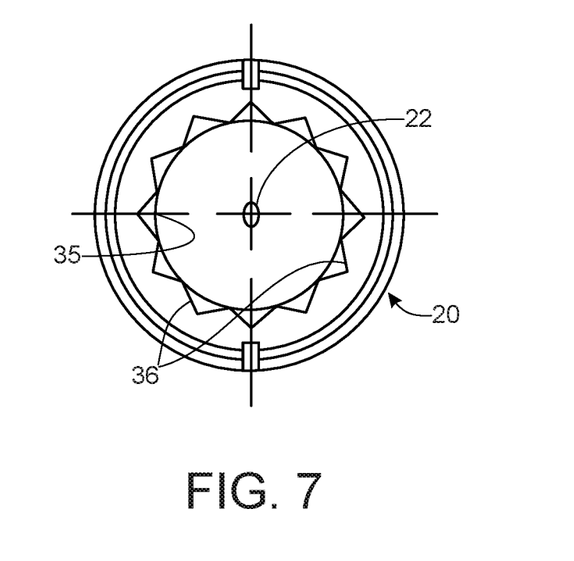
FIG. 7 is a downstream or bottom end view of the spray nozzle shown in FIG. 6.
Figure 8:
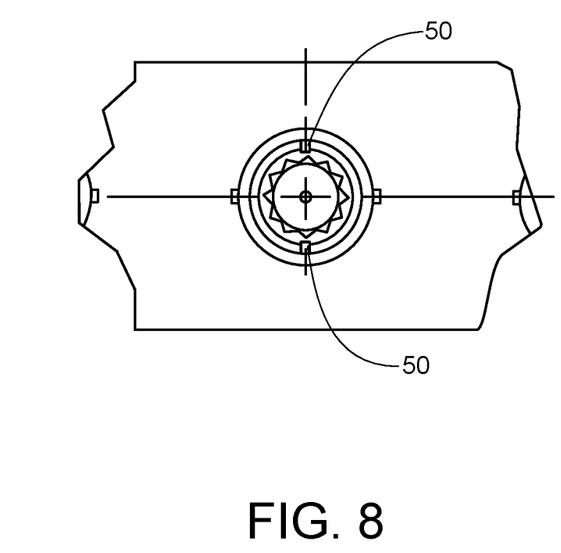
FIG. 8 is an enlarged plan view of one of the spray nozzles mounted in the illustrated spray header, as depicted in the circle labeled E in FIG. 3.

For sealing the liquid flow passage of the spray nozzle 20 in relation to the base member 27 within which it is mounted, the spray nozzle 20 is formed with an annular recess or groove 39 (FIG. 6) on an upper side in surrounding relation to the dome 21, sized for captively receiving and retaining an annular sealing member in the form of an o-ring 40. The o-ring 40 which is sized larger than the diameter of the annular groove 39 is retained by a friction fit in the annular groove 39, while protruding upwardly from the mounting ring 24 as depicted in FIG. 6. Upon screwing of the spray nozzle 20 into the base member 27, the o-ring 40 is compressed between the spray nozzle mounting ring 24 and the underside of the annular end or top wall 29 of the base member 27. It will be appreciated that with the o-ring 40 captively received in the annular groove 39 of the spray nozzle 20, the spray nozzle 20 and annular seal 40 may be handled and mounted as a single unit for facilitating assembly in the spray header 14 in even difficult to access locations, as will become apparent.

Figure 4:
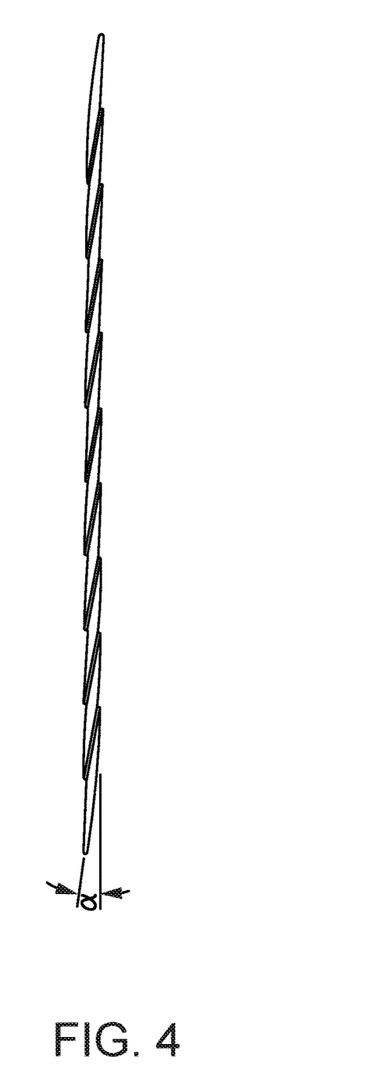
FIG. 4 is a depiction of the overlapping flat spray discharges from the spray header of the illustrated spraying system.

For effecting uniform cleaning, cooling, or coating by means of a flat fan spray discharging from the spray nozzles 20, it is necessary that the elongated discharge orifices 22 of the spray nozzles 20 be precisely oriented with respect to each other, such as at a common relatively small angle α to a longitudinal axis 45 of the spray header 14, for directing parallel flat spray patterns in partially overlying relation to each other as depicted in FIG. 4. Heretofore this has been difficult to achieve without tedious rotative positioning of spray nozzles, or utilization of relatively complex alignment mechanisms.

Pursuant to a further feature of the present embodiment, the spray nozzles 20 are formed with indicators 50 for facilitating mounting in the spray header 14 with the elongated discharge orifices 20 thereof oriented in precise angular relation to the longitudinal axis 45 of the header 14. In the illustrated embodiment, the spray nozzles 20 each is formed with a pair of diametrically opposed indicators in the form of notches 50. The indicator notches 50 in the illustrated embodiment are formed on an underside or downstream end of the mounting ring 24 so as to be visible to the installer of the spray nozzle 20 as the spray nozzle is screwed into the base members 27 of the recessed pockets 26. The indicator notches 50 in this case are located on the spray nozzle 20 such that when the spray nozzle 20 is screwed into the spray header 14 with the indicator notches 50 in aligned perpendicular relation to the longitudinal axis 45 of the spray header 14, the elongated discharge orifice 22 is properly oriented in precise angular relation to the longitudinal axis 45. While the illustrated indicator notches 50 are disposed for alignment in perpendicular relation to the longitudinal axis 45 of the spray header 14, it will be understood that alternatively they could be disposed for alignment parallel to the spray header 14.

During installation of the spray nozzles 20, each spray nozzle 20 may be screwed into full engagement with the internally threaded hub 28 of the base member 27 of the recessed pocket 26, and then backed off by reverse rotation until the indicators 50 are in properly aligned relation to the axis 45 of the spray header 14, thereby orienting the discharge orifice 22 of the spray nozzle 20 in predetermined relation to the spray header. It will be appreciated that by such mounting procedure the spray nozzle 20 typically is not in full threaded engagement with the base member hub 28.

Pursuant to a further feature of the present embodiment, the o-rings 40 of the spray nozzle 20 are designed to provide a reliable seal between the spray nozzle 20 and the base member 27 during both maximum and minimum squeeze conditions of the o-ring depending upon the setting of the alignment indicators 50. The o-rings 40 preferably are made of thermoplastic material, currently available under the trade name Viton, and are sized to maintain a sealed relationship between the spray nozzle 20 and base member 27 when the o-ring 40 is in a maximum squeeze condition with the spray nozzle 20 in full threaded engagement within the internally threaded hub 24, as well as during a minimum squeeze condition with the spray nozzle 20 backed off as much as 180 degrees from a full threaded engaged position with the base member. The o-ring 40 preferably protrudes outwardly of the recessed groove 39 within which it is retained a distance of at least ¾ of the pitch of the threads of the spray nozzle mounting ring 24. For purposes herein the term "maximum squeeze condition" means the condition the annular sealing member is squeezed between the annular retaining ring of the spray nozzle and the header upon normal screwing the retaining ring into threaded engagement with the header socket by an appropriate tool without excessive or undue force.

Hence, it can be seen that the spray nozzles 20 with their respective captively retained o-ring 40 are easily mounted in the spray header 14 with the elongated discharge orifice 20 in properly aligned relation to the longitudinal axis of the spray header 14 for direction of a uniform curtain of a sprayed liquid for coating, cooling, or other application. Likewise, the spray nozzle 20 can be easily removed for cleaning or o-ring replacement.

Figure 10:
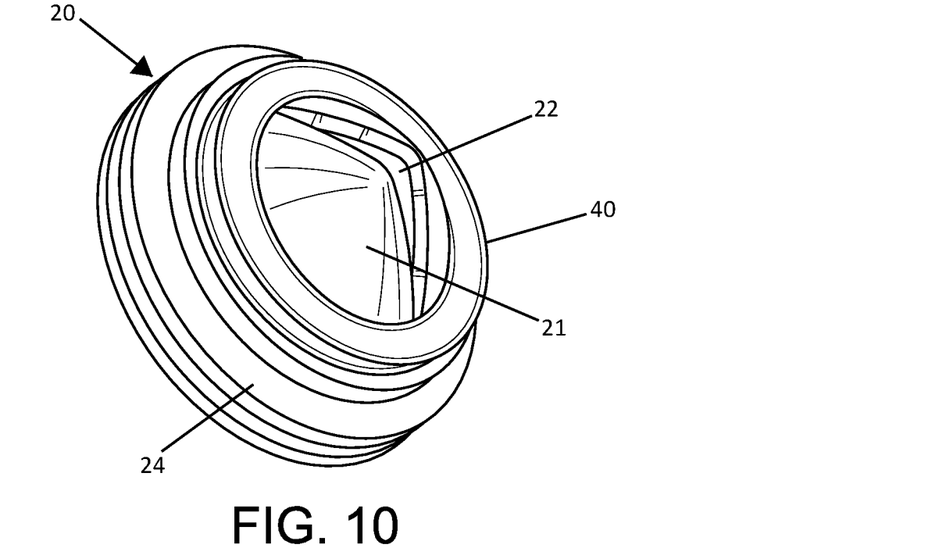
FIG. 10 is a perspective of a spray nozzle having an alternative form of annular sealing member captively retained thereon.
Figure 10A:
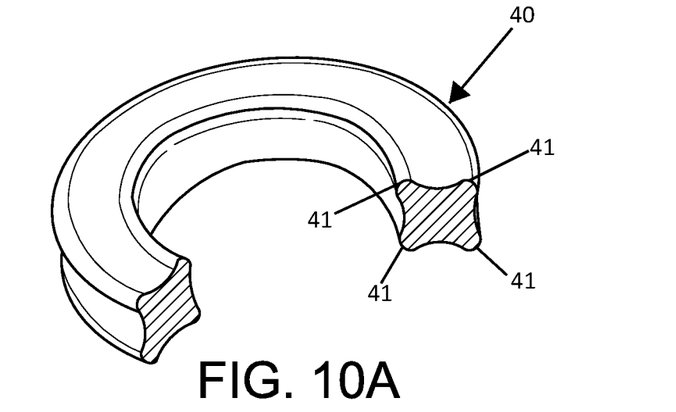
FIG. 10A is an enlarged cut away perspective of the annular sealing member shown in the spray nozzle depicted in FIG. 10.
Figure 10B:
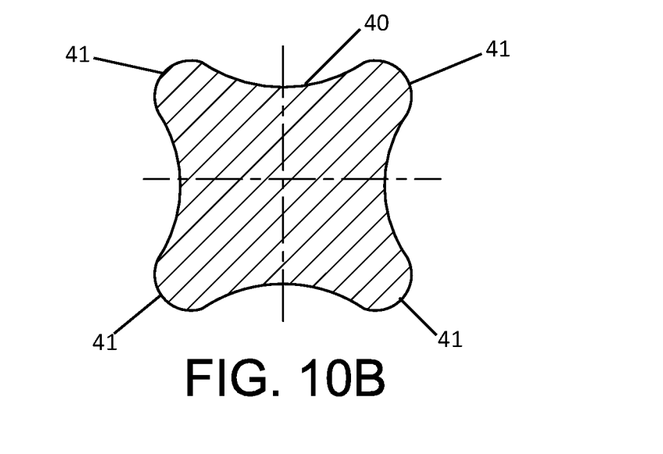
FIG. 10B is an enlarged transverse section of the annular sealing ring shown in FIG. 10A.

With reference to FIGS. 10, 10A, and 10B, there is shown a spray nozzle 20 having an alternative form of annular sealing member 40, wherein items similar to those described above have been given similar reference numerals. The spray nozzle sealing member 40 in this case has a generally rectangular or square cross section with pairs of outwardly protruding rounded corners 41 on opposite upstream and downstream sides for enhanced sealing contact with the annular mounting ring 24 of the spray nozzle and the underside of the spray head 14 within which it is mounted. The sealing member 40 in this case is positively retained within a rectangular configured annular groove 39 on the upstream side of the annular mounting ring 24. Besides providing a plurality of enhanced sealing contact areas on opposite sides of the annular sealing member 40 defined by the rounded corners 41, the rectangular configured sealing member 40 is further advantageous in that it enables greater protrusion of the sealing member from the retaining groove of the mounting ring 24 for increased compression when in a maximum squeeze condition upon securement of the spray nozzle 20 into its mounting pocket 26

With the spray nozzles 20 mounted in the spray header 14, the domes 21 of the spray nozzles 20 protrude into the spray header 14 such that the discharge orifices 22 can be routinely cleaned by an elongated cleaning brush 60 (FIG. 1) housed within the spray header 14 in a manner similar to that described in the above referenced patent. The illustrated cleaning brush 60 is housed within the header 14 and includes a rotatable shaft 61 having a plurality of brush segments 62a, 62b, 62c each comprising radial cleaning bristles. The brush shaft 61 is supported at opposite ends in appropriate bearings 64 for rotational and axial movement with respect to the header 14. The brush segments 62a, 62b, 62c preferably are oriented in diametrically offset relation to the shaft 61 such that as an incident to rotation of the shaft 61, the brush segments 62a, 62b, 62c successively clean respective numbers of the laterally spaced spray nozzles 20.

For imparting simultaneous axial movement of the brush shaft 61 as an incident to rotation thereof, a downstream end of the brush shaft 61 has a threaded pinion 66 which is disposed within a nut 68 fixed within a downstream housing section 69 of the header 14. As an incident to the rotation of the shaft 61 in one direction, the pinion 66 moves axially to the left in the nut 68, causing the brush segments 62a, 62b, 62c to move with a combination rotary and axial movement in sweeping fashion across the inlet ends of the nozzles 20 such that the bristles move any debris or solid material that is encumbering or clogging the passage of cleaning fluid to the nozzles. The valve member 21 is mounted on a downstream end of the shaft 61, such that such rotation of the shaft, which advances the brush 60 in a downstream direction, simultaneously moves the valve member 21 to an open position away from the valve seat 22, allowing pressurized liquid from the supply liquid to carry removed debris through the header 14 and out the discharge drain 48. Rotational movement of the shaft in an opposite direction causes the brush segments 62a, 62b, 62c to rotate and axially move in an opposite sweeping fashion across the nozzles 20 until the valve member 21 is seated with the valve seat 22, closing the header 14 from the drain 48, thereby enabling the header to resume a spraying.

A drive motor 70 in the illustrated embodiment is mounted on the support frame 15 and is operatively connected, via a drive pinion 78 and drive gear 79, to the cleaning brush shaft for effecting rotation of the cleaning brush. The pinion and drive gears 78, 79 are sufficiently wide in the axial direction so as to permit limited longitudinal movement of the gear 79 relative to the pinion with the brush shaft 61 as an incident to the brush shaft being rotatably driven. Notwithstanding such routine brush cleaning of the spray nozzles 20, when it is necessary to remove the spray nozzles 20 from the spray header 14 for further cleaning, replacement, or o-ring replacement, this may easily accomplished by simple unscrewing of the spray nozzle 20 from the base member 27 of the recessed socket 26.

Hence, it can be seen that a shower header spraying system is provided that has spray nozzles that are relatively simple in design and lend themselves to easy and reliable assembly and disassembly form the spray header. The spray nozzles have fewer parts for ease in handling and more efficient manufacture, and are adapted for easy mounting within the spray header with the discharge orifices of the spray nozzles precisely aligned for directing parallel flat spray discharge patterns for uniform cooling, cleaning, or other application.

The invention claimed is:

1. A shower header spray device comprising:
    an elongated spray header defining a liquid flow passage and having a plurality of laterally spaced liquid one piece spray nozzles arranged in alignment parallel to a longitudinal axis of the header, said one piece spray nozzles each having a liquid discharge orifice and being mounted in a corresponding pocket in the spray header;
    an elongated cleaning brush assembly including a rotatable brush housed in the spray header for cleaning the discharge orifices of the one piece spray nozzles;
    said one piece spray nozzles each having a central dome portion with the liquid discharge orifice and an integrally formed externally threaded cylindrical mounting ring; and
    said pockets each being internally threaded for receiving the externally threaded mounting ring of a respective one piece spray nozzle screwed into mounted engagement in the threaded pocket with the dome portion of the one piece spray nozzle extending upstream into the header for engagement by the rotatable brush during cleaning
    an annular sealing member retained on each said mounting ring;
    said mounting ring of each one piece spray nozzle having an upstream face formed with an annular retaining groove for captively receiving and retaining the annular sealing member with a potion protruding outwardly in an upstream direction for sealing engagement with a respective pocket of the header upon screwing of the mounting ring into threaded engagement with the header pocket.

2. The shower header spray device of claim 1 in which the annular sealing member of each one piece spray nozzle is designed to provide a reliable liquid seal between the one piece spray nozzle and the header during both a maximum squeeze condition in which the one piece spray nozzle is in fully threaded engagement with the internally threaded pocket as well as during a minimum squeeze condition with the one piece spray nozzle rotatably unscrewed from the maximum squeeze condition up to 180 degrees of rotation from the maximum squeeze condition.

3. The shower header spray device of claim 1 in which the mounting ring of each one piece spray nozzle has an internal annular surface formed with flats for receiving an appropriate tool for screwing the one piece spray nozzle into and out of engagement with the spray header pocket.

4. The shower header spray device of claim 1 in which the spray nozzle receiving pockets each are defined by a respective base member fixedly mounted in a respective opening in the header, said base members each comprising an internally threaded cylindrical annular opening into which the mounting ring of the one piece spray nozzle is screwed and an end wall formed with a central opening through which the dome portion of the respective one piece spray nozzle is positioned with the discharge orifice thereof in fluid communication with the spray header liquid passage.

5. The shower header spray device of claim 4 in which said base members each are cylindrical shaped and are mounted in a respective cylindrical opening of the spray header.

6. The shower header spray device of claim 5 in which said spray header has an elongated cylindrical shape, and said base member end wall has a semi-cylindrical shape corresponding in shape to an inner cylindrical side wall of the spray header.

7. The shower header spray device of claim 1 in which the annular sealing member for each one piece spray nozzle has a generally rectangular cross sectional shape with a pair of protruding rounded corners on opposite upstream and downstream sides for enhanced sealing engagement with the mounting ring of the spray nozzle and spray header.

8. The shower header spray device of claim 1 in which each one piece spray nozzle is formed with an elongated discharge orifice and the mounting ring thereof is formed with an externally exposed indicator located in predetermined relation to a longitudinal axis of the elongated discharge orifice of the one piece spray nozzle such that upon mounting of the one piece spray nozzles in the respective spray header pockets with the indictor of each one piece spray nozzle mounting ring oriented in common predetermined relation to the longitudinal axis of the spray header the elongated discharge orifices of each one piece spray nozzle is oriented in common predetermined angular relation to the longitudinal axis of the header.

9. The shower header spray device of claim 8 in which the mounting ring of each one piece spray nozzle is formed with a pair of indicator notches on a downstream end of the mounting ring so as to be visible to the installer of the one piece spray nozzle when screwed into the respective spray header pocket.

10. A shower header spray device comprising:
an elongated spray header defining a liquid flow passage and having a plurality of laterally spaced one piece spray nozzles arranged in alignment parallel to a longitudinal axis of the header, said one piece spray nozzles each having an elongated liquid discharge orifice being mounted in a corresponding pocket in the spray header;
an elongated cleaning brush assembly including a rotatable brush housed in the spray header for cleaning the discharge orifices of the spray nozzles;
said one piece spray nozzles each having a central dome portion formed with the elongated liquid discharge orifice and an externally threaded cylindrical mounting ring;
said pockets each being internally threaded for receiving the externally threaded mounting ring of a respective one piece spray nozzle screwed into mounted engagement in the threaded pocket with the dome portion of the one piece spray nozzle extending upstream into the header for engagement by the rotatable brush during cleaning;
an annular sealing member retained on an upstream axial side of said mounting ring
said mounting ring of each one piece spray nozzle having an upstream face formed with an annular retaining groove for captively receiving and retaining the annular sealing member with a potion protruding outwardly in an upstream direction for sealing engagement with a respective pocket of the header upon screwing of the mounting ring into threaded engagement with the header pocket; and
said one piece spray nozzles each have a pair of alignment indicators with a line through the indicators being in common predetermined relation to an axis through the elongated discharge orifice such that when the spray nozzle mounting rings are screwed into the header pockets with the line through the alignment indicators in similar predetermined relation to the longitudinal axis of the spray header the elongated discharge orifices of the one piece spray nozzles are commonly oriented with respect to the longitudinal axis of the spray header.

11. The shower header spray device of claim 10 in which the alignment indicators are notches in the mounting ring of the one piece spray nozzle.

12. The shower header spray device of claim 10 in which the spray header pockets are defined by separate mounting blocks fixed within the spray header.

13. A method of mounting a plurality of spray nozzles each having a central dome with an elongated discharge orifice and an externally threaded mounting ring in laterally spaced relation along a longitudinal axis of a liquid supply header comprising the steps of:
forming the header with a plurality of internally threaded laterally spaced spray nozzle receiving pockets;
captively retaining an annular sealing member on the mounting ring of each spray nozzle with a portion protruding outwardly of the mounting ring;
providing at least one position indicator on the mounting ring of each spray nozzle with the position indicator of each spray nozzle being located in similar predetermined relation to a longitudinal axis of the discharge orifice;
screwing the externally threaded mounting ring of each spray nozzle into a respective internally threaded pocket of the spray head so that a maximum squeeze condition exists on the sealing member between the spray header and spray nozzle retaining ring; and
unscrewing the spray nozzle mounting ring from the spray header pocket up to a maximum of 180 degrees of rotation from the maximum squeeze position for aligning the at least one indicator of each spray nozzle in similar predetermined relation to a longitudinal axis of the header for establishing a common angular orientation of the elongated discharge orifices of the plurality of spray nozzles with respect to the longitudinal axis of the header.

14. The method of claim 13 including forming the header with a plurality of internally threaded laterally spaced spray nozzle receiving pockets by forming the header with a plurality of laterally spaced cylindrical openings communicating with a central liquid supply passage of the header, and fixedly supporting within each opening a respective cylindrical base member formed with an internal annular threaded passageway within which the externally threaded mounting ring of a respective spray nozzle is screwed into mounted engagement.

15. A shower header spray device comprising:
- an elongated spray header defining a liquid flow passage and having a plurality of laterally spaced liquid spray nozzles arranged in alignment parallel to a longitudinal axis of the header, said spray nozzles each having a liquid discharge orifice and being mounted in a corresponding pocket in the spray header;
- an elongated cleaning brush assembly including a rotatable brush housed in the spray header for cleaning the discharge orifices of the spray nozzles;
- said spray nozzles each having a central dome portion with the liquid discharge orifice and an externally threaded cylindrical mounting ring;
- said pockets each being internally threaded for receiving the externally threaded mounting ring of a respective spray nozzle screwed into mounted engagement in the threaded pocket with the dome portion of the spray nozzle extending into the header for engagement by the rotatable brush during cleaning;
- an annular sealing member interposed in sealing engagement between each spray nozzle mounting ring and the header upon screwing of the spray nozzle mounting ring into threaded engagement with the threaded pocket;
- said mounting ring of each one piece spray nozzle being formed with an annular retaining groove for positively receiving and retaining the annular sealing member with a portion protruding outwardly of the mounting ring for engagement with the header upon screwing of the mounting ring into threaded engagement with the header pocket;
- said annular sealing member of each spray nozzle is designed to provide a reliable liquid seal between the spray nozzle and the header during both a maximum squeeze condition in which the spray nozzle is in fully threaded engagement with the internally threaded pocket as well as during a minimum squeeze condition with the spray nozzle rotatably unscrewed from the maximum squeeze condition up to 180 degrees of rotation from the maximum squeeze condition; and
- said external threads of the mounting ring of each spray nozzle have a predetermined pitch, and said annual sealing member of each spray nozzle protrudes outwardly of the retaining groove of the mounting ring within which it is retained a distance of at least 3/4 of the pitch of the external threads of the mounting ring.

\* \* \* \* \*